(12) United States Patent
Yao et al.

(10) Patent No.: US 12,481,283 B2
(45) Date of Patent: Nov. 25, 2025

(54) METHOD FOR CONTROLLING AUTONOMOUS MOBILE DEVICE, AUTONOMOUS MOBILE DEVICE, AND COMPUTER STORAGE MEDIUM

(71) Applicant: Willand (Beijing) Technology Co., LTD., Beijing (CN)

(72) Inventors: Zhuo Yao, Beijing (CN); Degan Lin, Beijing (CN)

(73) Assignee: Willand (Beijing) Technology Co., LTD. (CN)

( * ) Notice: Subject to any disclaimer, the term of this patent is extended or adjusted under 35 U.S.C. 154(b) by 287 days.

(21) Appl. No.: 18/185,509

(22) Filed: Mar. 17, 2023

(65) Prior Publication Data
US 2023/0297114 A1    Sep. 21, 2023

(30) Foreign Application Priority Data
Mar. 18, 2022    (CN) .......................... 202210270364.6

(51) Int. Cl.
| | | |
|---|---|---|
| *G05D 1/02* | (2020.01) | |
| *A01D 34/00* | (2006.01) | |
| *G05D 1/00* | (2006.01) | |
| *A01D 101/00* | (2006.01) | |

(52) U.S. Cl.
CPC ......... *G05D 1/0214* (2013.01); *A01D 34/008* (2013.01); *A01D 2101/00* (2013.01)

(58) Field of Classification Search
None
See application file for complete search history.

(56) References Cited

U.S. PATENT DOCUMENTS

| | | | |
|---|---|---|---|
| 2010/0324782 A1* | 12/2010 | Gupta | ............. B60W 30/18009 701/41 |
| 2014/0324269 A1 | 10/2014 | Abramson et al. | |
| 2016/0129593 A1 | 5/2016 | Wolowelsky et al. | |
| 2017/0367252 A1* | 12/2017 | Sakaguchi | ........... A01B 69/008 |

(Continued)

FOREIGN PATENT DOCUMENTS

| | | |
|---|---|---|
| CN | 109845475 A | 6/2019 |
| CN | 112230644 A | 1/2021 |

(Continued)

*Primary Examiner* — Anne Marie Antonucci
*Assistant Examiner* — Kyle S Park
(74) *Attorney, Agent, or Firm* — Emerson, Thomson & Bennett, LLC; Roger D. Emerson; Matt J. Wilson (57) ABSTRACT

A method for controlling an autonomous mobile device, an autonomous mobile device, and a computer storage medium are provided. The method includes: determining a plurality of candidate positions based on a first coordinate set; determining one of the candidate positions satisfying a safety condition for rotating the autonomous device as a first position; controlling the autonomous mobile device to turn at the first position so that the autonomous mobile device is perpendicular to a first boundary corresponding to the first coordinate set, and a tail of the autonomous mobile device is closer to the first boundary than a head of the autonomous mobile device; controlling the autonomous mobile device to move backward to a second position; and controlling the autonomous mobile device to turn at the second position so that the autonomous mobile device is parallel to the first boundary.

16 Claims, 6 Drawing Sheets

(56) References Cited

U.S. PATENT DOCUMENTS

| | | |
|---|---|---|
| 2020/0045880 A1 | 2/2020 | Letsky |
| 2022/0124973 A1* | 4/2022 | Juel ...................... A01D 34/008 |
| 2022/0281444 A1* | 9/2022 | Takaki ............... B60W 60/0011 |
| 2024/0069557 A1* | 2/2024 | Morimoto ............ G05D 1/0278 |

FOREIGN PATENT DOCUMENTS

| | | | |
|---|---|---|---|
| CN | 113064408 A | 7/2021 | |
| CN | 113296495 A | 8/2021 | |
| CN | 113348847 A | 9/2021 | |
| EP | 2806325 A2 | 11/2014 | |
| EP | 3018548 A1 | 5/2016 | |
| EP | 3698618 A1 | 8/2020 | |
| WO | WO-2020155715 A1 * | 8/2020 | ........... G05D 1/0219 |

\* cited by examiner

METHOD FOR CONTROLLING AUTONOMOUS MOBILE DEVICE, AUTONOMOUS MOBILE DEVICE, AND COMPUTER STORAGE MEDIUM

CROSS REFERENCE

The present application claims the priorities of Chinese patent application 202210270364.6, filed on Mar. 18, 2022, and entitled "METHOD FOR CONTROLLING AUTONOMOUS MOBILE DEVICE, AUTONOMOUS MOBILE DEVICE, AND COMPUTER STORAGE MEDIUM", the complete disclosure of which is expressly incorporated by reference herein.

TECHNICAL FIELD

The present disclosure relates to the technical field of smart devices, and in particular to, a method for controlling an autonomous mobile device, an autonomous mobile device, and a computer storage medium.

BACKGROUND

An autonomous mobile device has a mobile apparatus, a working apparatus, and a control apparatus, and can autonomously move and work within a certain range. Common autonomous mobile devices include a sweeping robot, a transfer robot, a food delivery robot, and an autonomous mobile gardening device. The autonomous mobile gardening device includes an automatic mowing robot. The automatic mowing robot can automatically mow grasses autonomously or uncontrolledly, thereby reducing time occupation of a user, and reducing labor of the user.

The autonomous mobile device usually works within a certain work region, which is defined by a boundary. In some working modes (for example, mowing along the boundary of a lawn and safety check of a mowing robot), the autonomous mobile device (especially an autonomous mobile device with a rear-mounted movement center) is required to work in proximity to or in close proximity to the boundary of the work region. A method is required to make the autonomous mobile device work in fully close proximity to the boundary based on safety guarantee without collision.

SUMMARY

In view of the above problems, embodiments of the present disclosure are presented to provide a method for controlling an autonomous mobile device, an autonomous mobile device, and a computer storage medium, to at least solve the problem that the existing autonomous mobile device fails to work in fully close proximity to the boundary.

One or more embodiments of the present disclosure provide a method for controlling an autonomous mobile device. A memory of the autonomous mobile device stores a first coordinate set, the first coordinate set including coordinates of the autonomous mobile device when a work region of the autonomous mobile device is planned. The method for controlling an autonomous mobile device includes: determining a plurality of candidate positions based on the first coordinate set; determining one of the candidate positions satisfying a safety condition for rotating/turning the autonomous mobile device as a first position; controlling the autonomous mobile device to turn at the first position so that the autonomous mobile device is perpendicular to a first boundary corresponding to the first coordinate set, and a tail of the autonomous mobile device is closer to the first boundary than a head of the autonomous mobile device; controlling the autonomous mobile device to move backward to a second position; and controlling the autonomous mobile device to turn at the second position so that the autonomous mobile device is parallel to the first boundary.

In some embodiments, the first coordinate set corresponds to coordinates of a movement center of the autonomous mobile device when the work region of the autonomous mobile device is planned.

In some embodiments, the plurality of candidate positions is determined by: setting the candidate positions for a plurality of coordinates in the first coordinate set such that connecting lines between the candidate positions and corresponding coordinates in the first coordinate set are perpendicular to the first boundary.

In some embodiments, the plurality of candidate positions is determined by: determining a second coordinate set based on the first coordinate set, where the second coordinate set corresponds to a second boundary, and the second boundary is parallel to the first boundary; and selecting the plurality of candidate positions from the work region, where distances between each of the candidate positions and the second boundary are identical.

In some embodiments, the safety condition is that the autonomous mobile device unobstructedly rotates by 360 degrees at the candidate position.

In some embodiments, whether the candidate position satisfies the safety condition is ascertained by: determining a second coordinate set according to the first coordinate set, where the second coordinate set corresponds to a second boundary, and the second boundary is parallel to the first boundary; ascertaining whether a circle with the candidate position as a circle center and a predetermined length as a radius intersects with the second boundary or a boundary of a forbidden region; and determining that the candidate position satisfies the safety condition if the circle with the candidate position as the circle center and the predetermined length as the radius neither intersects with the second boundary nor intersects with the boundary of the forbidden region, and determining that the candidate position does not satisfy the safety condition if the circle with the candidate position as the circle center and the predetermined length as the radius intersects with the second boundary or the boundary of the forbidden region.

In some embodiments, the movement center of the autonomous mobile device is the circle center, a radius of a largest circumcircle of the autonomous mobile device is R, and the predetermined length is R.

In some embodiments, the second coordinate set corresponds to coordinates of a width definition point of the autonomous mobile device when the work region of the autonomous mobile device is planned.

In some embodiments, the first boundary is parallel to the second boundary with an equal distance therebetween.

In some embodiments, the autonomous mobile device rotates by 90 degrees at the second position.

In some embodiments, the method further includes: controlling the autonomous mobile device to work.

In some embodiments, a movement center of the autonomous mobile device is behind a geometric center.

In some embodiments, the autonomous mobile device is a mowing robot.

According to another aspect of the present disclosure, an autonomous mobile device is provided, including a controller and a memory. The memory stores a first coordinate set, the first coordinate set corresponds to coordinates of the autonomous mobile device when a work region of the autonomous mobile device is planned, and the controller is configured to execute a method for controlling an autonomous mobile device. The method includes: controlling the autonomous mobile device to turn at the first position so that the autonomous mobile device is perpendicular to a first boundary corresponding to the first coordinate set, and a tail of the autonomous mobile device is closer to the first boundary than a head of the autonomous mobile device; controlling the autonomous mobile device to move backward to a second position; and controlling the autonomous mobile device to turn at the second position so that the autonomous mobile device is parallel to the first boundary.

According to another aspect of the present disclosure, a computer storage medium is provided. The computer storage medium stores computer executable instructions, where the computer executable instructions are used for executing a method for controlling an autonomous mobile device. The method includes: controlling the autonomous mobile device to turn at the first position so that the autonomous mobile device is perpendicular to a first boundary corresponding to the first coordinate set, and a tail of the autonomous mobile device is closer to the first boundary than a head of the autonomous mobile device; controlling the autonomous mobile device to move backward to a second position; and controlling the autonomous mobile device to turn at the second position so that the autonomous mobile device is parallel to the first boundary.

In solutions of embodiments of the present disclosure, the autonomous mobile device is controlled to turn at a first position so that the autonomous mobile device is perpendicular to a first boundary, a tail of the autonomous mobile device is closer to the first boundary than a head of the autonomous mobile device, the autonomous mobile device moves backward to a second position, and the autonomous mobile device turns at the second position so that the autonomous mobile device is parallel to the first boundary. In this way, a distance between the autonomous mobile device after turning at the second position and a second boundary is closer, thereby improving work coverage of the autonomous mobile device in a work region. In addition, the rotation safety is checked at the first position, thereby improving the safety.

BRIEF DESCRIPTION OF THE DRAWINGS

To more clearly describe technical solutions of embodiments of the present disclosure or existing technologies, drawings to be used in the description of the embodiments or the existing technologies will be briefly introduced below. Apparently, the drawings described below are some embodiments of the present disclosure. For those of ordinary skills in the art, other drawings may also be obtained based on these drawings without making creative work.

DETAILED DESCRIPTION OF EMBODIMENTS

To enable those in the technical field to better understand solutions in the present disclosure, technical solutions in embodiments of the present disclosure will be clearly and completely described below with reference to drawings in the embodiments of the present disclosure. Apparently, the described embodiments are some embodiments, rather than all embodiments, of the present disclosure. All other embodiments obtained by those of ordinary skills in the art based on the embodiments of the present disclosure without making creative work are encompassed within the scope of protection of the present disclosure.

In order to facilitate explanation and understanding, before a method for controlling an autonomous mobile device is described, a structure and a working scenario of the autonomous mobile device are briefly described below.

The autonomous mobile device has been widely used in production and life to replace manual labor. The autonomous mobile device can autonomously move and work within a certain range. The autonomous mobile device may be a mowing robot. The mowing robot may be configured to trim a lawn to guarantee that grass height within the lawn satisfies requirements. Of course, in other embodiments, the autonomous mobile device may be other devices that can autonomously walk, such as a sweeping robot.

Figure 1A:
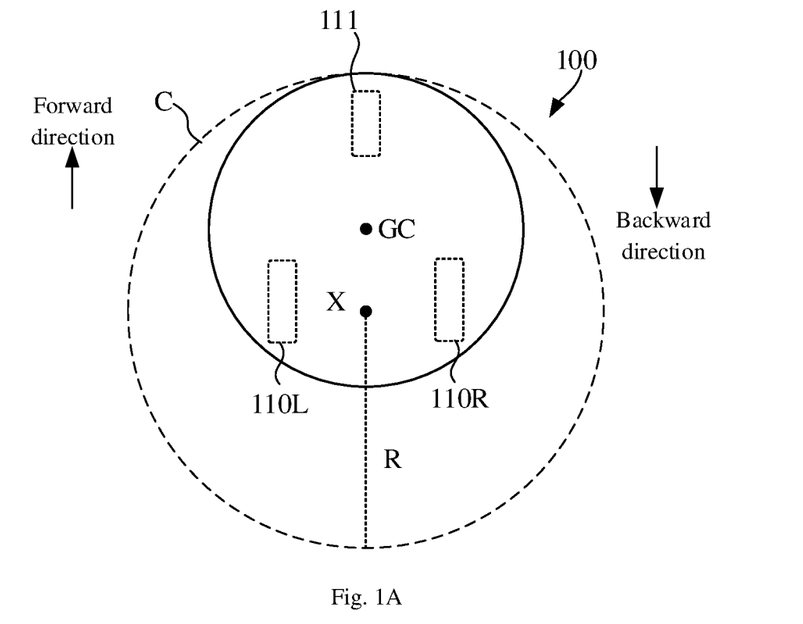
FIG. 1A is an example of an autonomous mobile device provided in an embodiment of the present disclosure.

FIG. 1A is an example of an autonomous mobile device. As shown in FIG. 1A, the autonomous mobile device 100 has an approximately circular shape. The autonomous mobile device 100 includes a first driving wheel 110L, a second driving wheel 110R, and a driven wheel 111. The autonomous mobile device 100 has a head and a tail. The first driving wheel 110L and the second driving wheel 110R are arranged at positions close to the tail of the autonomous mobile device 100. The driven wheel 111 is arranged at a position close to the head of the autonomous mobile device 100. The driven wheel 111 is, for example, a universal wheel. The autonomous mobile device 100 has a geometric center (GC) and a movement center (X). For a circular autonomous mobile device, the geometric center (GC) is located at a circle center. The first driving wheel 110L and the second driving wheel 110R can be driven independently of each other. The autonomous mobile device 100 can make movements, such as forward movement, backward movement, turning, in-situ rotation, and climbing. The movement mode (movement direction and movement speed) of the autonomous mobile device 100 can be implemented by driving modes of the first driving wheel 110L and the second driving wheel 110R. When the first driving wheel 110L and the second driving wheel 110R rotate at a same speed, the autonomous mobile device 100 moves forward or backward. For example, the first driving wheel 110L and the second driving wheel 110R rotate clockwise at a same speed, the autonomous mobile device 100 moves forward; and when the first driving wheel 110L and the second driving wheel 110R rotate counterclockwise at a same speed, the autonomous mobile device 100 moves backward. The forward direction and the backward direction of the autonomous mobile device 100 can be preset during design. For example, when the autonomous mobile device 100 works along a planned work path, the movement direction of the autonomous mobile device 100 is the forward direction, the head of the autonomous mobile device 100 is in front, and the tail of the autonomous mobile device is behind.

The autonomous mobile device 100 can rotate by 360 degrees in situ. The movement center (X) is a point on a rotation axis of the autonomous mobile device 100, i.e., when the autonomous mobile device 100 rotates in situ, the movement center (X) has no displacement. For example, when one of the first driving wheel 110L and the second driving wheel 110R rotates clockwise while the other rotates counterclockwise, the autonomous mobile device 100 rotates around a longitudinal axis passing through the movement center (X).

In the autonomous mobile device 100 shown in FIG. 1A, the movement center (X) is behind the geometric center (GC), i.e., the movement center (X) is in the rear of the autonomous mobile device 100. Herein, the autonomous mobile device 100 with the movement center (X) behind the geometric center (GC) is referred to as an autonomous mobile device 100 with a rear-mounted movement center. FIG. 1A further shows a maximum circumscribing circle C with the movement center (X) of the autonomous mobile device 100 as a circle center. The maximum circumscribing circle C can be determined based on the movement center (X) and a point farthest from the movement center (X) on the autonomous mobile device 100. It can be understood that when the autonomous mobile device 100 rotates around the movement center (X), the autonomous mobile device 100 will not exceed a range of the maximum circumscribing circle C. FIG. 1A further shows a radius R of the maximum circumscribing circle C.

The autonomous mobile device 100 may further have other shape/outline. For example, the autonomous mobile device 100 may have a D-shape or an elongated D-shape, such as a rectangle or an ellipse.

Figure 1B:
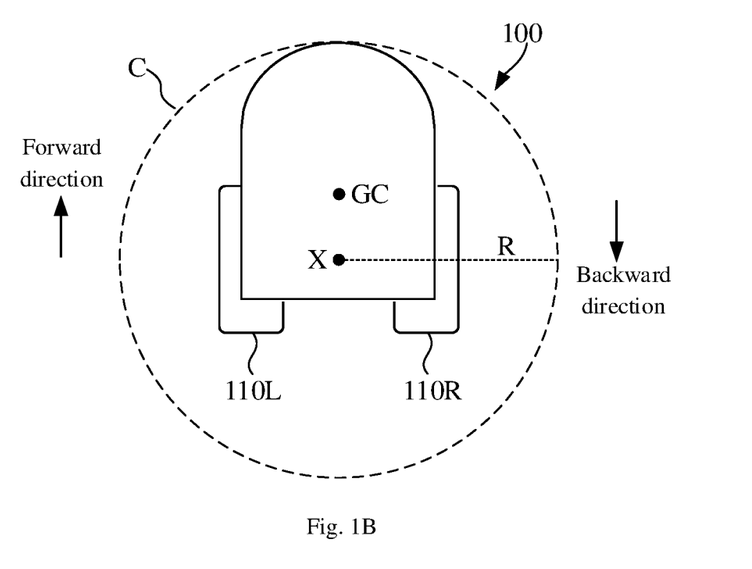
FIG. 1B is another example of the autonomous mobile device provided in an embodiment of the present disclosure.

FIG. 1B is another example of the autonomous mobile device. As shown in FIG. 1B, the autonomous mobile device 100 has an approximately elongated D shape. The autonomous mobile device 100 has a first driving wheel 110L and a second driving wheel 110R. The movement center (X) is located at a position between the first driving wheel 110L and the second driving wheel 110R, and is also located behind the geometric center (GC). The autonomous mobile device 100 shown in FIG. 1B is also an autonomous mobile device 100 with a rear-mounted movement center. FIG. 1B further shows a maximum circumscribing circle C with the movement center (X) of the autonomous mobile device 100 as a circle center and a radius R of the maximum circumscribing circle C. Movement control of the autonomous mobile device 100 shown in FIG. 1B is the same as that of the autonomous mobile device 100 shown in FIG. 1A.

Figure 2:
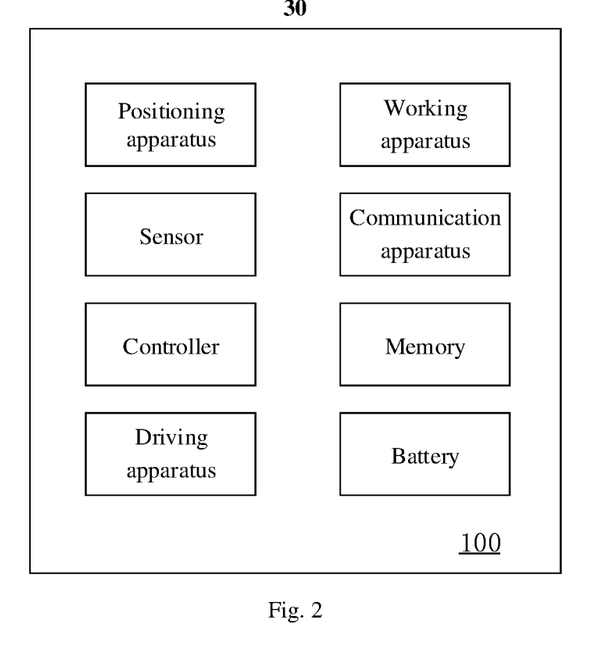
FIG. 2 is a structural block diagram of the autonomous mobile device provided in an embodiment of the present disclosure.

FIG. 2 is a structural block diagram of the autonomous mobile device provided in an embodiment of the present disclosure. As shown in FIG. 2, the autonomous mobile device 100 includes a positioning apparatus, a working apparatus, a sensor, a communication apparatus, a controller, a memory, a driving apparatus, and a battery.

The positioning apparatus includes, for example, one or more of a satellite positioning system, an ultra-wideband wireless communication positioning (UWB) system, an inertial measurement unit (IMU), and a wheel speedometer. A position of an automatic mowing robot at a current moment can be detected by the positioning apparatus. The position can be expressed as its coordinates on an X axis and a Y axis of a positioning coordinate system. Specifically, coordinates of the autonomous mobile device 100 are represented by coordinates of its movement center (X). The autonomous mobile device 100 includes at least one pair of driving wheels 110. The driving wheels are controlled by the driving apparatus to control a movement direction and a movement speed of the autonomous mobile device 100. The driving apparatus may include a motor and a motor controller. The motor controller may be, e.g., a MCU or a PLC chip.

The working apparatus is a part of the autonomous mobile device for executing a target work. For example, the autonomous mobile device 100 is a sweeping robot, and the working apparatus is a cleaning apparatus; or the autonomous mobile device 100 is a mowing robot, and the working apparatus is a mowing apparatus including a blade and a motor driving the blade. The sensor may include an obstacle detection sensor, which can detect an obstacle around the autonomous mobile device 100 by ultrasonic or infrared detection, for example, a pet suddenly running to the front of the autonomous mobile device.

The communication apparatus can realize communication between the autonomous mobile device 100 and an electronic device. The electronic device may be, e.g., a remote controller of the autonomous mobile device 100 or a mobile terminal on which control software of the autonomous mobile device 100 runs. The communication apparatus is, for example, a WiFi module or a Bluetooth module. The controller may be implemented as, e.g., a MCU, a DSP, or an ASIC. A user can send a command to the autonomous mobile device 100 through the electronic device, and the controller can receive the command through a communication module to complete a corresponding operation. The autonomous mobile device 100 may further include, e.g., a display screen, a control button, a matching circuit board. The memory is configured to store, e.g., a boundary of a work region, and a traversal algorithm of the work region. The memory is, e.g., a non-volatile memory. The battery is configured to supply power for, e.g., the positioning apparatus, the working apparatus, the sensor, the communication apparatus, the controller, the memory, and the driving apparatus.

Generally, the autonomous mobile device is required to pre-establish a map of the work region before working. For example, the user needs to first plan a mowing area of the mowing robot, such that the mowing robot autonomously works in the mowing area. The working mode of the autonomous mobile device 100 may include a work region planning mode and an autonomous working mode. In the work region planning mode, the user plans the work region of the autonomous mobile device 100 in a customized way. In the autonomous working mode, the autonomous mobile device 100 determines a current position using the positioning apparatus, and acquires coordinates of a next position according to the planned work path to achieve autonomous movement. The work region is usually defined by a boundary of the work region. In some embodiments, the boundary of the work region can be implemented by burying wires. In some embodiments, the boundary of the work region may include coordinates of a series of position points. In addition, there may be an obstacle or a subregion where work is not required within the work region. For example, the autonomous mobile device is a mowing robot, a lawn is set as a work region, a tree in the lawn is an obstacle where the mowing robot cannot work, and ornamental flowers in the lawn are in a subregion where work is not required, so that it is necessary to set a forbidden region for the tree and the flowers.

In some embodiments, the boundary of the work region may be planned by driving the autonomous mobile device 100 to move and recording a series of position coordinates of the autonomous mobile device 100 during the movement. The position coordinates of the autonomous mobile device 100 may be obtained through the positioning apparatus. For example, the user can control the autonomous mobile device 100 to move through the electronic device, thereby setting the boundary of the work region. The electronic device is, for example, a mobile terminal or a special remote controller of the autonomous mobile device 100. The electronic device can communicate with the autonomous mobile device 100 through a wireless network. The electronic device is installed with a control program of the autonomous mobile device, and is equipped with button options to control the movement mode of the autonomous mobile device 100 (for example, forward movement, backward movement, left turn, or right turn). The user controls the autonomous mobile device 100 to move by clicking different button options. The positioning apparatus of the autonomous mobile device 100 collects the position coordinates of the autonomous mobile device 100 at a certain frequency, and the coordinates of the autonomous mobile device 100 are characterized by the coordinates of its movement center (X). A set of these position coordinates constitutes a movement path of the autonomous mobile device 100, serves as the boundary of the work region, and is stored in the memory of the autonomous mobile device 100. Herein, a set of the coordinates of the movement center (X) stored in the memory of the autonomous mobile device 100 is referred to as a first coordinate set. The first coordinate set is the set of the coordinates of the autonomous mobile device 100 obtained through the positioning apparatus when the work region of the autonomous mobile device 100 is planned. The first coordinate set corresponds to a trajectory of the movement center (X) when the work region of the autonomous mobile device 100 is planned.

Figure 3:
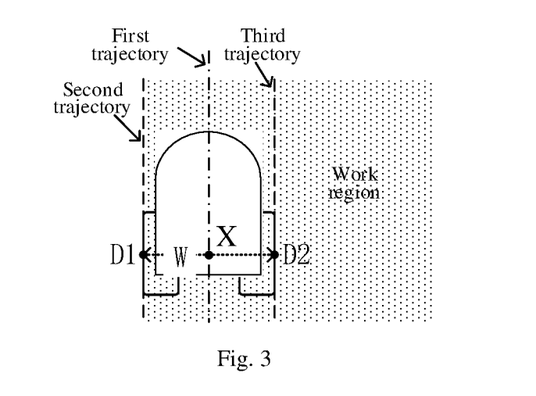
FIG. 3 is a schematic diagram of a trajectory of the autonomous mobile device provided in an embodiment of the present disclosure when a work region of the autonomous mobile device 100 is planned.

Since the autonomous mobile device 100 has a certain outline and volume, when the work region of the autonomous mobile device 100 is planned, an actual trajectory of the autonomous mobile device 100 has a certain width. FIG. 3 is a schematic diagram of a trajectory of the autonomous mobile device provided in an embodiment of the present disclosure when a work region of the autonomous mobile device 100 is planned. Since the autonomous mobile device 100 has a certain width (W), a movement trajectory of the autonomous mobile device 100 also has the width (W). The movement trajectory of the autonomous mobile device 100 includes a first trajectory, a second trajectory, and a third trajectory. Since the autonomous mobile device 100 has a first width definition point D1 and a second width definition point D2 defining its width (W), the second trajectory corresponds to a trajectory of a first point, the third trajectory corresponds to a trajectory of a second point, and the first trajectory corresponds to a trajectory of the movement center (X). The first trajectory, the second trajectory, and the third trajectory are parallel, and a distance between the first trajectory and the second trajectory is W/2. Herein, the first trajectory is also referred to as a first boundary, and the second trajectory is also referred to as a second boundary. Generally, a region between the first trajectory and the second trajectory is also a region where the autonomous mobile device 100 is required to work. However, since the autonomous mobile device 100 has a certain outline and volume, the autonomous mobile device 100 cannot fully work for a work region close to a boundary, thereby affecting work coverage of the work region.

Figure 4A:
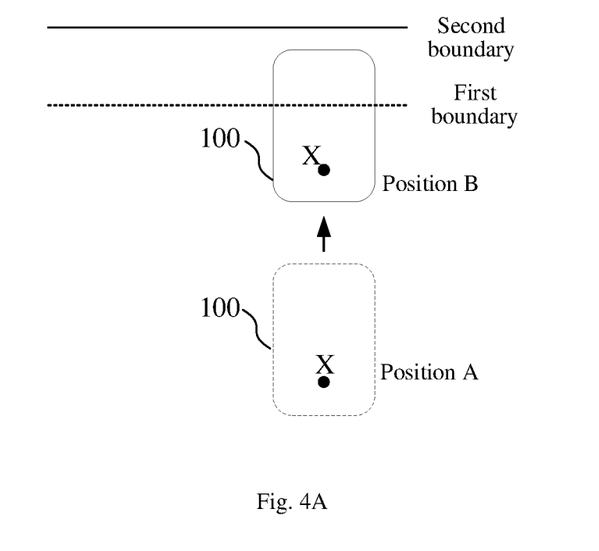
FIG. 4A and FIG. 4B show an edging process of an autonomous mobile robot in an associated technology.
Figure 4B:
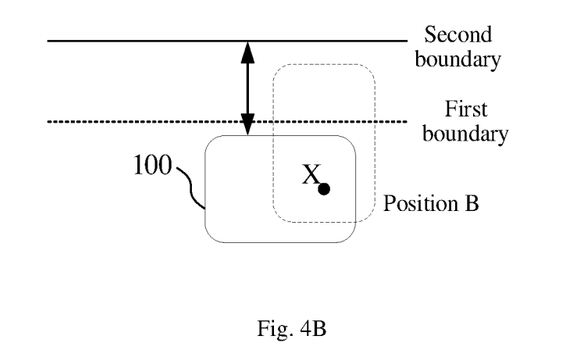

FIG. 4A and FIG. 4B show an edging process of an autonomous mobile robot in an associated technology. As shown in FIG. 4A and FIG. 4B, the autonomous mobile device 100 turns at a position A in a work region, so that the autonomous mobile device 100 is perpendicular to a target segment of a boundary of the work region (i.e., a forward direction of the autonomous mobile device 100 is perpendicular to the target segment of the boundary of the work region), the autonomous mobile device 100 moves forward to a position B straightly, the autonomous mobile device 100 rotates by 90 degrees at the position B with a movement center (X) as a circle center, so that the autonomous mobile device 100 is parallel to the target segment of the boundary of the work region, and the autonomous mobile device 100 moves forward along a direction parallel to the target segment of the boundary of the work region to execute an edging work. When approaching the boundary of the work region in this way, the autonomous mobile device 100 has a large distance from the boundary of the work region with low work coverage.

Figure 5:
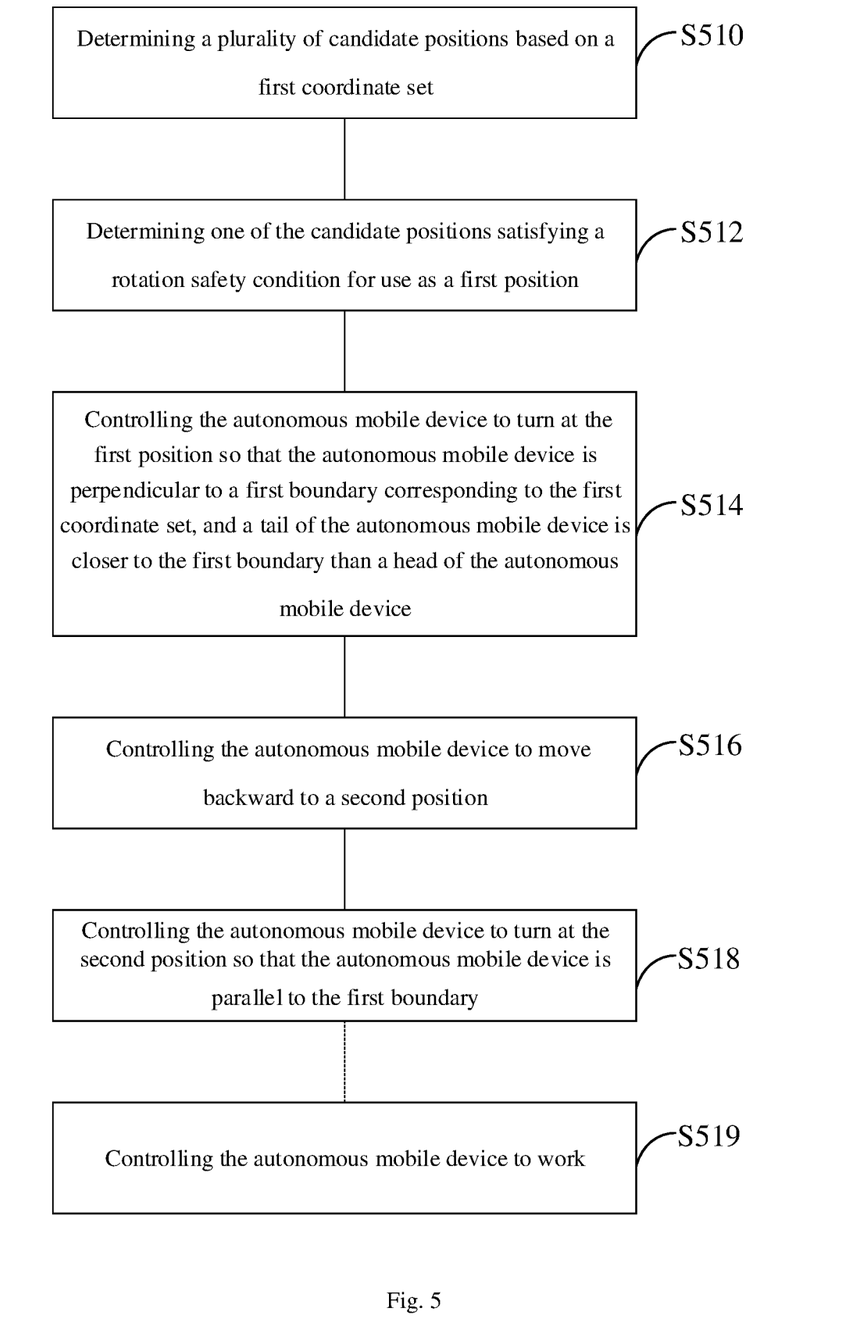
FIG. 5 is a flowchart of a method for controlling an autonomous mobile device provided in an embodiment of the present disclosure.

FIG. 5 is a flowchart of a method for controlling an autonomous mobile device provided in an embodiment of the present disclosure. The control method includes the following steps:

Step S510: determining a plurality of candidate positions based on a first coordinate set. The first coordinate set stored in a memory of the autonomous mobile device 100 defines a work region of the autonomous mobile device 100. The first coordinate set is a set of coordinates of a movement center (X) of the autonomous mobile device 100 obtained in a work region planning mode. In step S510, the plurality of candidate positions is determined in the work region of the autonomous mobile device 100 based on the first coordinate set. The first coordinate set corresponds to a first boundary of the work region, and the first boundary corresponds to a trajectory of the movement center (X) of the autonomous mobile device 100 in the work region planning mode. The first boundary includes, for example, a plurality of straight line segments.

In some embodiments, the plurality of candidate positions is obtained by the following approach. Candidate positions are set for a plurality of coordinates in the first coordinate set such that connecting lines between the candidate positions and corresponding coordinates in the first coordinate set are perpendicular to the first boundary. For example, a controller of the autonomous mobile device 100 selects a plurality of coordinates from the first coordinate set, and determines coordinates of the candidate positions corresponding to the coordinates in the work region according to the selected coordinates, where connection lines between the selected coordinates and corresponding candidate positions thereof are perpendicular to the first boundary. Distances between the selected coordinates and the corresponding candidate positions thereof are identical.

In other embodiments, the plurality of candidate positions is obtained by the following approach. A second coordinate set is determined according to the first coordinate set, the second coordinate set corresponds to a second boundary, and the second boundary is parallel to the first boundary; the plurality of candidate positions in the work region is selected, and distances between each of the candidate positions and the second boundary are identical. The first coordinate set is the set of the coordinates of the movement center (X) of the autonomous mobile device 100 obtained in the work region planning mode. There is a constant relative position relationship between the movement center (X) of the autonomous mobile device 100 and a width definition point of the autonomous mobile device 100 corresponding to the second boundary. The relative position relationship depends on a shape and a size of the autonomous mobile device 100. Therefore, the second coordinate set corresponding to the second boundary can be obtained according to the first coordinate set. The controller of the autonomous mobile device 100 selects a plurality of coordinates from the second coordinate set, and determines coordinates of the candidate positions corresponding to the coordinates in the work region according to the selected coordinates, where connection lines between the selected coordinates and corresponding candidate positions thereof are perpendicular to the second boundary. Distances between the selected coordinates and the corresponding candidate positions thereof are identical.

Step S512: determining one of the candidate positions satisfying a safety condition for rotating the mobile device as a first position. The controller of the autonomous mobile device 100 performs a rotation safety check on each of the candidate positions. A candidate position passing the rotation safety check is a candidate position satisfying the safety condition. The safety condition is that the autonomous mobile device 100 can unobstructedly rotate by 360 degrees at the candidate position. The candidate position is represented by coordinates. The autonomous mobile device 100 at the candidate position means that the movement center (X) of the autonomous mobile device 100 is at the candidate position. When the autonomous mobile device 100 can unobstructedly rotate by 360 degrees at the candidate position with the movement center (X) as the circle center, the candidate position passes the rotation safety check. A candidate position satisfying certain conditions is selected from the candidate positions satisfying the safety condition as the first position. In some embodiments, a candidate position closest to a current position of the autonomous mobile device 100 is selected from the candidate positions satisfying the safety condition as the first position.

In some embodiments, whether the candidate position satisfies the safety condition is ascertained by: determining a second coordinate set according to the first coordinate set, where the second coordinate set corresponds to a second boundary, and the second boundary is parallel to the first boundary; ascertaining whether a circle with the candidate position as a circle center and a predetermined length as a radius intersects with the second boundary or a boundary of a forbidden region; and determining that the candidate position satisfies the safety condition if the circle with the candidate position as the circle center and the predetermined length as the radius neither intersects with the second boundary nor intersects with the boundary of the forbidden region, and determining that the candidate position does not satisfy the safety condition if the circle with the candidate position as the circle center and the predetermined length as the radius intersects with the second boundary or the boundary of the forbidden region.

Specifically, the second coordinate set can be determined according to the first coordinate set, a movement direction of each coordinate of the autonomous mobile device 100 in the first coordinate set when the work region is planned, and one half of a width of the autonomous mobile device 100. The second coordinate set corresponds to coordinates of the width definition point of the autonomous mobile device when the work region of the autonomous mobile device 100 is planned.

Figure 6:
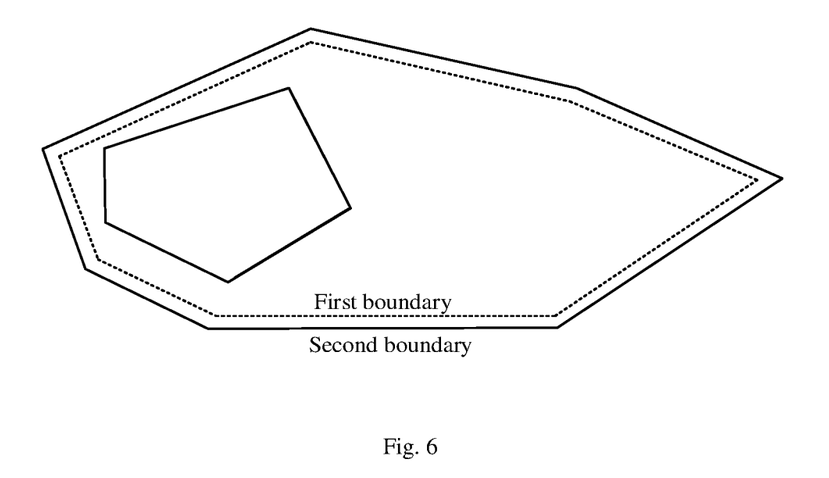
FIG. 6 shows a schematic diagram of determining a second boundary corresponding to a second coordinate set according to a first boundary corresponding to a first coordinate set in a memory.

FIG. 6 shows a schematic diagram of determining a second boundary corresponding to a second coordinate set according to a first boundary corresponding to a first coordinate set in a memory. As shown in FIG. 6, the second boundary is parallel to the first boundary, a distance between the second boundary and the first boundary is W/2, and the second boundary can be obtained by extending W/2 from the first boundary.

Figure 7:
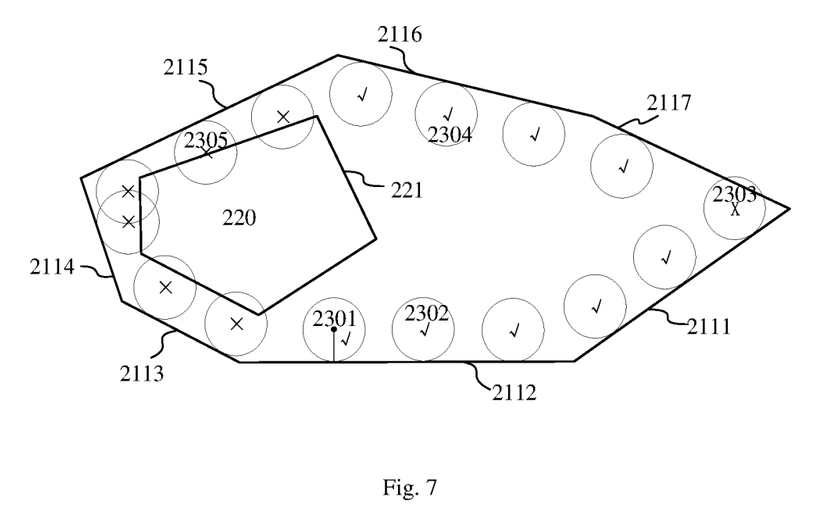
FIG. 7 shows a schematic diagram on whether a candidate position satisfies a safety condition for rotating/turning the autonomous mobile device provided in an embodiment of the present disclosure.

FIG. 7 shows a schematic diagram on whether a candidate position satisfies a safety condition for rotating/turning the autonomous mobile device provided in an embodiment of the present disclosure. As shown in FIG. 7, the second boundary includes a plurality of segments 2111-2117, and a controller determines a plurality of candidate positions. The controller ascertains whether a circle with the candidate position as a circle center and a predetermined length as a radius intersects with the second boundary or a boundary 221 of a forbidden region 220. As shown in FIG. 7, a circle with one of candidate positions 2301, 2302, and 2304 as a circle center and the predetermined length as a radius neither intersects with the second boundary nor intersects with the boundary 221 of the forbidden region 220, such that the candidate positions 2301, 2302, and 2304 satisfy the safety condition. A candidate position 2303 is determined based on the segment 2111 of the second boundary, a circle with the candidate position 2303 as a circle center and the predetermined length as a radius intersects with the segment 2117 of the second boundary, such that the candidate position 2303 does not satisfy the safety condition. A candidate position 2305 is determined based on the segment 2115 of the second boundary, a circle with the candidate position 2305 as a circle center and the predetermined length as a radius intersects with the boundary 221 of the forbidden region 220, such that the candidate position 2305 does not satisfy safety condition. In some embodiments, the movement center (X) of the autonomous mobile device 100 is the circle center, a radius of a largest circumcircle of the autonomous mobile device is R, and the predetermined length is R. FIG. 1A and FIG. 1B show that the radius of the maximum circumscribing circle of the example autonomous mobile device 100 is R.

Figure 8A:
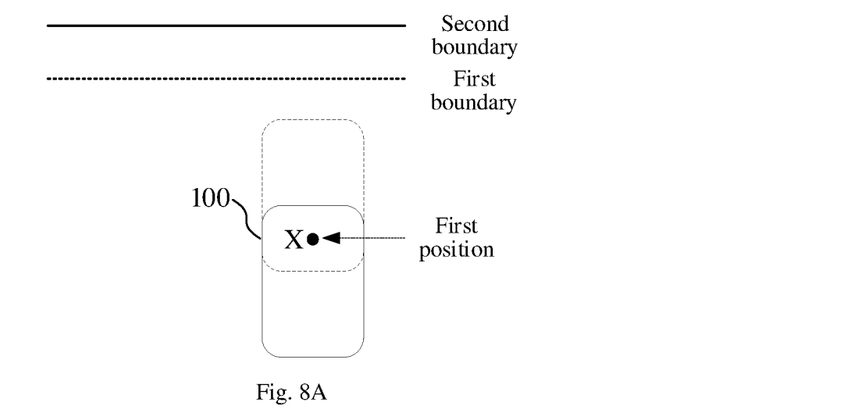
FIG. 8A-FIG. 8C show an edging process of the autonomous mobile robot provided in an embodiment of the present disclosure.

Step S514: controlling the autonomous mobile device 100 to turn at the first position so that the autonomous mobile device 100 is perpendicular to a first boundary corresponding to the first coordinate set, and a tail of the autonomous mobile device is closer to the first boundary than a head of the autonomous mobile device. The first boundary is parallel to the second boundary, so that the autonomous mobile device after turning is also perpendicular to the second boundary. The autonomous mobile device 100 moves from the current position to the first position, and turns at the first position, so that the autonomous mobile device 100 is perpendicular to the first boundary, and the tail of the autonomous mobile device is closer to the first boundary than the head of the autonomous mobile device. As shown in FIG. 8A, the autonomous mobile device 100 performs a turning operation at the first position, and the coordinates of the movement center (X) remain unchanged during the turning operation. The dotted line is the autonomous mobile device 100 before the turning, and the solid line is the autonomous mobile device 100 after the turning.

Figure 8B:
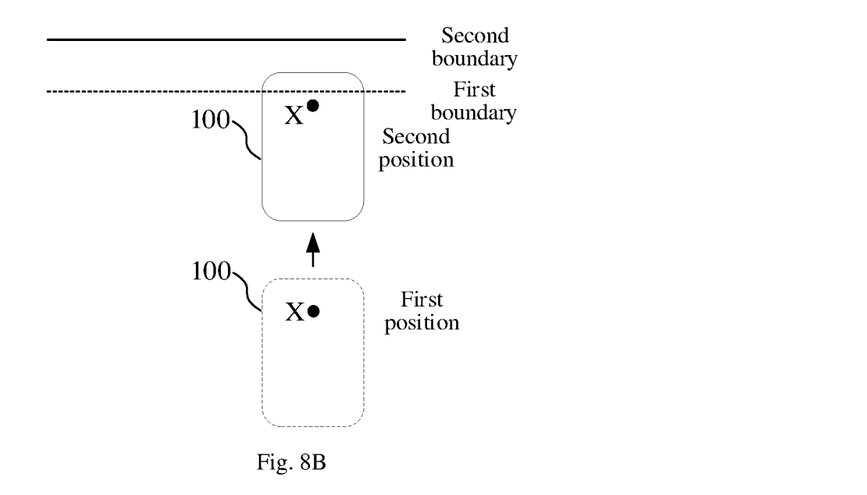

Step S516: controlling the autonomous mobile device to move backward to a second position. As shown in FIG. 8B, the autonomous mobile device moves backward from the first position to the second position along a straight line. When the autonomous mobile device 100 moves backward, the tail of the autonomous mobile device 100 is in front of the head of the autonomous mobile device along the movement direction. For an autonomous mobile device 100 with a rear-mounted movement center, when the autonomous mobile device 100 moves backward, the geometric center (GC) is behind the movement center (X) along the movement direction. The second position is determined, e.g., based on the first boundary. The second position is selected in the work region. The second position is closer to the first boundary than the first position. In some embodiments, the second position is on the first boundary.

Figure 8C:
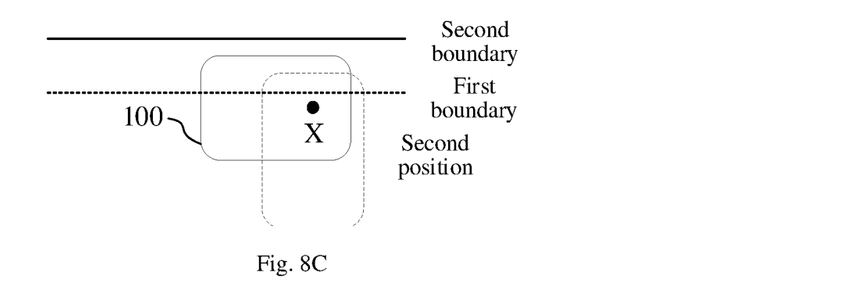

Step S518: controlling the autonomous mobile device to turn at the second position so that the autonomous mobile device is parallel to the first boundary. As shown in FIG. 8C, the autonomous mobile device 100 turns by 90 degrees at the second position, the dotted line is the autonomous mobile device 100 before the turning, the solid line is the autonomous mobile device 100 after the turning, and the autonomous mobile device 100 after the turning is parallel to the first boundary. The autonomous mobile device 100 may not need the rotation safety check at the second position.

In some embodiments, the control method further includes step S519: controlling the autonomous mobile device 100 to work. The autonomous mobile device 100 is, for example, a mowing robot, which moves along a direction parallel to the first boundary to execute a mowing operation. The autonomous mobile device 100 is, for example, a cleaning robot, which moves along a direction parallel to the first boundary to execute a cleaning operation.

As shown in FIG. 8C, an edging process of the autonomous mobile device 100 is implemented using this control method, such that the autonomous mobile device 100 is closer to the second boundary of the work region, and can more fully process the work region between the first boundary and the second boundary, thereby improving work coverage. When the second position is on the first boundary, the autonomous mobile device 100 can keep close to the second boundary, thereby further improving the work coverage. It can be understood that the control method provided in the present disclosure is particularly adapted to the autonomous mobile device with the rear-mounted movement center.

The control method may be applied to the above autonomous mobile device 100, and may be executed by a controller of the autonomous mobile device 100. A memory of the autonomous mobile device 100 stores a first coordinate set, and the first coordinate set includes coordinates of the autonomous mobile device when a work region of the autonomous mobile device is planned.

In some embodiments, the control method may also be executed by an electronic device, which sends a planned path to the autonomous mobile device.

The present disclosure further provides a computer storage medium, where the computer storage medium stores computer executable instructions, and the computer executable instructions are used for executing the above method for controlling an autonomous mobile device.

Some embodiments of the present disclosure further provide a control apparatus of an autonomous mobile device. The control apparatus includes: a third module configured to control the autonomous mobile device to turn at a first position, such that the autonomous mobile device is perpendicular to a first boundary corresponding to the first coordinate set, and a tail of the autonomous mobile device is closer to the first boundary than a head of the autonomous mobile device, a fourth module configured to control the autonomous mobile device to move backward to a second position, and a fifth module configured to control the autonomous mobile device to turn at the second position so that the autonomous mobile device is parallel to the first boundary.

According to some embodiments of the present disclosure, the control apparatus of the autonomous mobile device may further include: a first module to a fifth module. The first module is configured to determine a plurality of candidate positions based on the first coordinate set.

It should be noted that, in the description of the present disclosure, the terms "first" and "second" are only used for ease of description of different components or names, and cannot be understood as indicating or implying sequential relationship and relative importance or implicitly indicating the number of indicated technical features. Thus, features defined with "first" or "second" may explicitly or implicitly include at least one of the features.

Unless otherwise defined, all technical terms and scientific terms used herein have the same meaning as commonly understood by those skilled in the technical field of the present disclosure. The terms used herein in the description of the present disclosure are only for the purpose of describing specific embodiments, and are not intended to limit the present disclosure.

It should be noted that, the specific embodiments of the present disclosure are described in detail with reference to the drawings, but should not be understood as imposing any limitation on the scope of protection of the present disclosure. Within the scope described in the claims, various alterations and modifications that can be made by those skilled in the art without making creative work are still encompassed within the scope of protection of the present disclosure.

The examples of the embodiments of the present disclosure are intended to simply illustrate the technical features of the embodiments of the present disclosure, so that those skilled in the art can intuitively understand the technical features of the embodiments of the present disclosure, which are not used to impose any improper limitation on the embodiments of the present disclosure.

Finally, it should be noted that: the above embodiments are merely used to illustrate the technical solutions of the present disclosure, instead of imposing any limitation on the present disclosure. Although the present disclosure has been described in detail with reference to the above embodiments, those with ordinary skills in the art should understand that: the technical solutions disclosed in the above embodiments may still be modified or a part of the technical features thereof may be replaced equivalently. These modifications or replacements are not intended to make the essence of corresponding technical solutions depart from the spirit and scope of the technical solutions of the embodiments of the present disclosure.

What is claimed is:

1. A method for controlling an autonomous mobile device with a movement center behind its geometric center, wherein a memory of the autonomous mobile device stores a first coordinate set, and the first coordinate set comprises coordinates of the movement center of the autonomous mobile device acquired when the autonomous mobile device moves along a boundary of a work region during the planning of the boundary of the work region of the autonomous mobile device, the method comprising:

determining a plurality of candidate positions based on the first coordinate set;

determining one of the candidate positions satisfying a safety condition for rotating the autonomous mobile device as a first position, wherein whether the one of the candidate positions satisfies the safety condition for rotating the autonomous mobile device is determined by: determining whether a maximum circumscribing circle intersects with a second boundary or a boundary of a forbidden region when the autonomous mobile device is at the one of the candidate positions, wherein the maximum circumscribing circle is centered on the movement center of the autonomous mobile device and has a radius of a distance from a point farthest from the movement center on the autonomous mobile device to the movement center, the second boundary is parallel to a first boundary and at a distance of half the width of the autonomous mobile device from the first boundary;

controlling the autonomous mobile device to turn at the first position so that the autonomous mobile device is perpendicular to the first boundary corresponding to the first coordinate set, and a tail of the autonomous mobile device is closer to the first boundary than a head of the autonomous mobile device;

controlling the autonomous mobile device to move backward to a second position; and controlling the autonomous mobile device to turn at the second position so that the autonomous mobile device is parallel to the first boundary.

2. The method according to claim 1, wherein the plurality of candidate positions is determined by the following operation (a) or (b):

(a) setting the candidate positions for a plurality of coordinates in the first coordinate set such that connecting lines between the candidate positions and corresponding coordinates in the first coordinate set are perpendicular to the first boundary; and (b) determining a second coordinate set based on the first coordinate set, wherein the second coordinate set corresponds to the second boundary, and the second boundary is parallel to the first boundary; and selecting the plurality of candidate positions in the work region, wherein distances between each of the candidate positions and the second boundary are identical.

3. The method according to claim 1, wherein the safety condition is that the autonomous mobile device unobstructedly rotates by 360 degrees at the one of the candidate positions.

4. The method according to claim 3, wherein whether the one of the candidate positions satisfies the safety condition is ascertained by:

determining a second coordinate set according to the first coordinate set, wherein the second coordinate set corresponds to the second boundary, and the second boundary is parallel to the first boundary;

ascertaining whether a circle with the one of the candidate positions as a circle center and a predetermined length as a radius intersects with the second boundary or the boundary of the forbidden region; and determining that the one of the candidate positions satisfies the safety condition when the circle with the one of the candidate positions as the circle center and the predetermined length as the radius neither intersects with the second boundary nor intersects with the boundary of the forbidden region, and determining that the one of the candidate positions does not satisfy the safety condition when the circle with the one of the candidate positions as the circle center and the predetermined length as the radius intersects with the second boundary or the boundary of the forbidden region.

5. The method according to claim 4, wherein the movement center of the autonomous mobile device is the circle center, the radius of the maximum circumscribing circle is R, and the predetermined length is R.

6. The method according to claim 4, wherein the second coordinate set corresponds to coordinates of a width definition point of the autonomous mobile device when the work region of the autonomous mobile device is planned.

7. The method according to claim 4, wherein the first boundary is parallel to the second boundary with an equal distance therebetween.

8. The method according to claim 1, wherein the autonomous mobile device rotates by 90 degrees at the second position.

9. The method according to claim 1, wherein the method further comprises: controlling the autonomous mobile device to work.

10. The method according to claim 1, wherein the autonomous mobile device is a mowing robot.

11. An autonomous mobile device with a movement center behind its geometric center, comprising a controller and a memory, wherein the memory stores a first coordinate set, the first coordinate set corresponds to coordinates of the movement center of the autonomous mobile device acquired when the autonomous mobile device moves along a boundary of a work region during the planning of the boundary of the work region of the autonomous mobile device, and the controller is configured to execute a method for controlling the autonomous mobile device, the method comprising:

determining a plurality of candidate positions based on the first coordinate set;

determining one of the candidate positions satisfying a safety condition for rotating the autonomous mobile device as a first position, wherein whether the one of the candidate positions satisfies the safety condition for rotating the autonomous mobile device is determined by: determining whether a maximum circumscribing circle intersects with a second boundary or a boundary of a forbidden region when the autonomous mobile device is at the one of the candidate positions, wherein the maximum circumscribing circle is centered on the movement center of the autonomous mobile device and has a radius of a distance from a point farthest from the movement center on the autonomous mobile device to the movement center, the second boundary is parallel to a first boundary and at a distance of half the width of the autonomous mobile device from the first boundary;

controlling the autonomous mobile device to turn at the first position so that the autonomous mobile device is perpendicular to the first boundary corresponding to the first coordinate set, and a tail of the autonomous mobile device is closer to the first boundary than a head of the autonomous mobile device;

controlling the autonomous mobile device to move backward to a second position; and controlling the autonomous mobile device to turn at the second position so that the autonomous mobile device is parallel to the first boundary.

12. The autonomous mobile device according to claim 11, wherein the plurality of candidate positions is determined by the following operation (a) or (b):

(a) setting the candidate positions for a plurality of coordinates in the first coordinate set such that connecting lines between the candidate positions and the coordinates in the corresponding first coordinate set are perpendicular to the first boundary; and (b) determining a second coordinate set based on the first coordinate set, wherein the second coordinate set corresponds to the second boundary, and the second boundary is parallel to the first boundary; and selecting the plurality of candidate positions in the work region, wherein distances between each of the candidate positions and the second boundary are identical.

13. The autonomous mobile device according to claim 11, wherein the safety condition is that the autonomous mobile device unobstructedly rotates by 360 degrees at the one of the candidate positions.

14. The autonomous mobile device according to claim 11, wherein whether the candidate positions satisfy the safety condition is ascertained by:

determining a second coordinate set according to the first coordinate set, wherein the second coordinate set corresponds to the second boundary, and the second boundary is parallel to the first boundary;

ascertaining whether a circle with the one of the candidate positions as a circle center and a predetermined length as a radius intersects with the second boundary or the boundary of the forbidden region; and determining that the one of the candidate positions satisfies the safety condition when the circle with the one of the candidate positions as the circle center and the predetermined length as the radius neither intersects with the second boundary nor intersects with the boundary of the forbidden region, and determining that the one of the candidate positions does not satisfy the safety condition when the circle with the one of the candidate positions as the circle center and the predetermined length as the radius intersects with the second boundary or the boundary of the forbidden region.

15. The autonomous mobile device according to claim 14, wherein the movement center of the autonomous mobile device is the circle center, the radius of the maximum circumscribing circle is R, and the predetermined length is R.

16. A non-transitory computer storage medium, wherein the non-transitory computer storage medium stores computer executable instructions and the computer executable instructions are used for executing a method for controlling an autonomous mobile device with a movement center behind its geometric center, wherein a memory stores a first coordinate set, the first coordinate set corresponds to coordinates of the movement center of the autonomous mobile device acquired when the autonomous mobile device moves along a boundary of a work region during the planning of the boundary of the work region of the autonomous mobile device, the method comprising:

determining a plurality of candidate positions based on the first coordinate set;

determining one of the candidate positions satisfying a safety condition for rotating the autonomous mobile device as a first position, wherein whether the one of the candidate positions satisfies the safety condition for rotating the autonomous mobile device is determined by: determining whether a maximum circumscribing circle intersects with a second boundary or a boundary of a forbidden region when the autonomous mobile device is at the one of the candidate positions, wherein the maximum circumscribing circle is centered on the movement center of the autonomous mobile device and has a radius of a distance from a point farthest from the movement center on the autonomous mobile device to the movement center, the second boundary is parallel to a first boundary and at a distance of half the width of the autonomous mobile device from the first boundary;

controlling the autonomous mobile device to turn at the first position so that the autonomous mobile device is perpendicular to the first boundary corresponding to a first coordinate set, and a tail of the autonomous mobile device is closer to the first boundary than a head of the autonomous mobile device;

controlling the autonomous mobile device to move backward to a second position; and controlling the autonomous mobile device to turn at the second position so that the autonomous mobile device is parallel to the first boundary.

* * * * *